United States Patent
Booher

[11] Patent Number: 5,474,331
[45] Date of Patent: Dec. 12, 1995

[54] COMPOSITE TRAILER ASSEMBLY USING BI-METAL MATERIALS

[76] Inventor: Howard Booher, 1871 State Rte. 44, Randolph, Ohio 44265

[21] Appl. No.: 368,151

[22] Filed: Dec. 29, 1994

[51] Int. Cl.$^6$ ............... B62D 21/20; B62D 21/02; B62D 53/06
[52] U.S. Cl. ............ 280/789; 280/781; 280/799; 296/182; 228/262.44
[58] Field of Search ............... 280/789, 781, 280/799, 796, 785, 423.1; 296/182, 900; 228/262.44, 189

[56] References Cited

U.S. PATENT DOCUMENTS

| | | |
|---|---|---|
| 2,600,140 | 6/1952 | Torseth . |
| 2,758,870 | 8/1956 | Nallinger . |
| 2,812,192 | 11/1957 | Cole ................................. 280/789 |
| 3,175,284 | 3/1965 | Cotovsky . |
| 3,295,197 | 1/1967 | Bunn et al. . |
| 3,319,393 | 5/1967 | Tautlinger et al. ................ 296/182 |
| 3,460,235 | 8/1969 | Roberts et al. . |
| 3,597,832 | 8/1971 | Calton et al. . |
| 3,612,569 | 10/1971 | Marinelli ............................ 280/789 |
| 3,630,694 | 12/1971 | Enright et al. ................... 228/262.44 |
| 3,664,816 | 5/1972 | Finnegan ......................... 228/262.44 |
| 3,872,577 | 3/1975 | Kugler et al. ................... 228/262.44 |
| 3,975,612 | 8/1976 | Nakazaki et al. . |
| 4,212,405 | 7/1980 | Schmidt . |
| 4,281,235 | 7/1981 | Peloquin ......................... 228/262.44 |
| 4,534,589 | 8/1985 | Booher ............................ 296/182 |
| 4,564,233 | 1/1986 | Booher ............................ 296/182 |
| 4,626,022 | 12/1986 | Booher ............................ 296/182 |
| 4,787,669 | 11/1988 | Wante .............................. 280/789 |
| 4,904,017 | 2/1990 | Ehrlich . |

FOREIGN PATENT DOCUMENTS

| | | | |
|---|---|---|---|
| 0437655 | 7/1991 | European Pat. Off. ........... | 280/789 |
| 4081288 | 3/1992 | Japan ................................ | 228/262.44 |
| 2203393 | 10/1988 | United Kingdom ............. | 280/789 |

Primary Examiner—Margaret A. Focarino
Assistant Examiner—Peter C. English
Attorney, Agent, or Firm—Harpman & Harpman

[57] ABSTRACT

Composite of trailer construction utilizing steel and aluminum components to take advantage of the durability and light weight of aluminum components and the proven strength and fabrication ease of structural steel. More particularly, the process of the present invention is directed towards an apparatus and method of securing two dissimilar metals together in a trailer construction by using a bi-metal intermediate element which is provided for the welding of the like materials to form a superior bond between the bi-metal and the respective dissimilar materials.

18 Claims, 3 Drawing Sheets

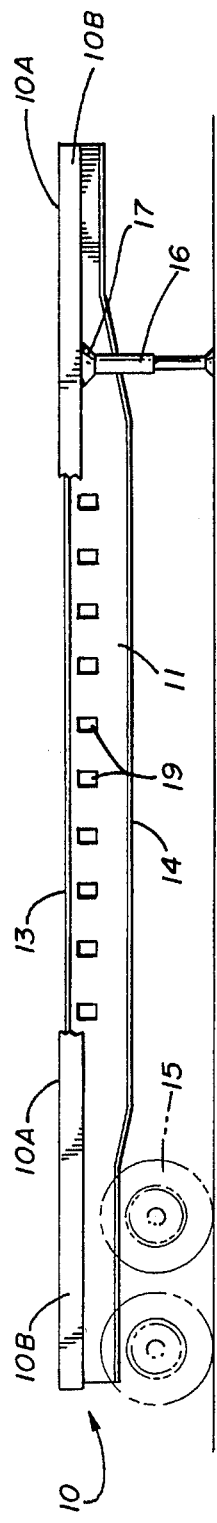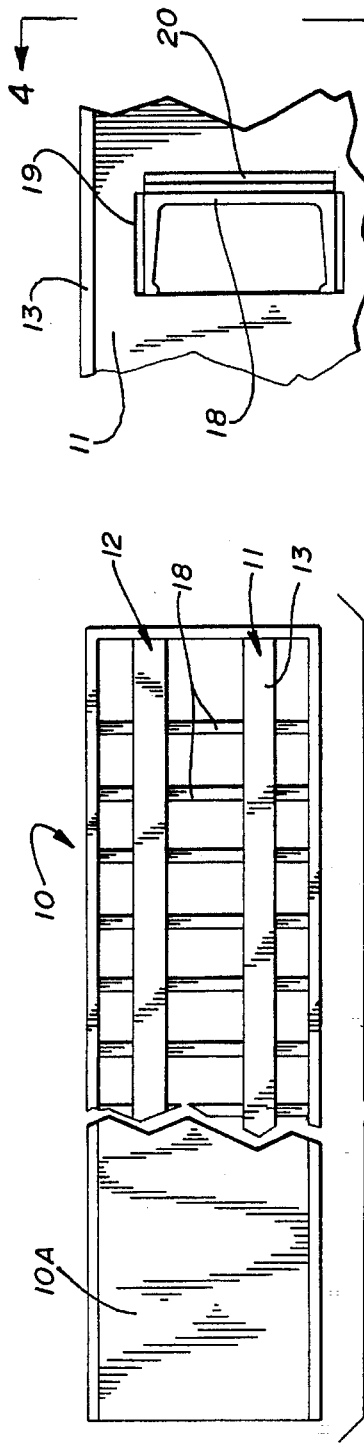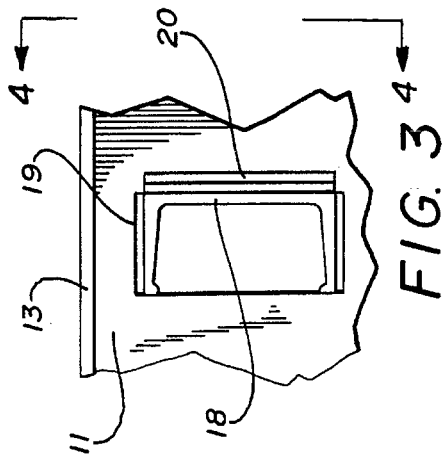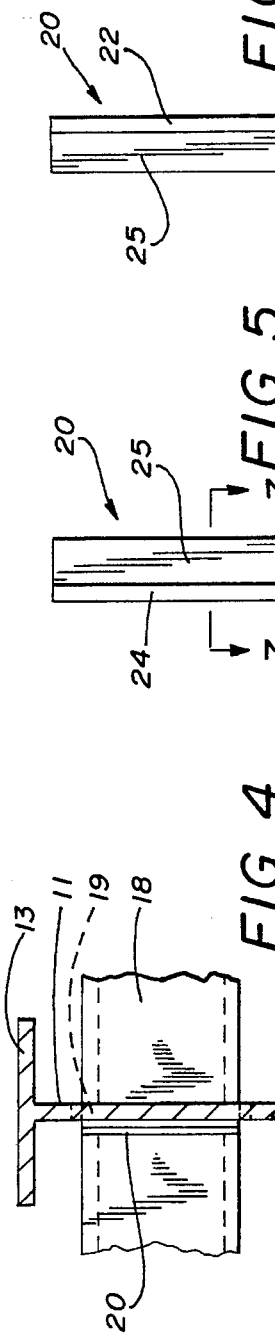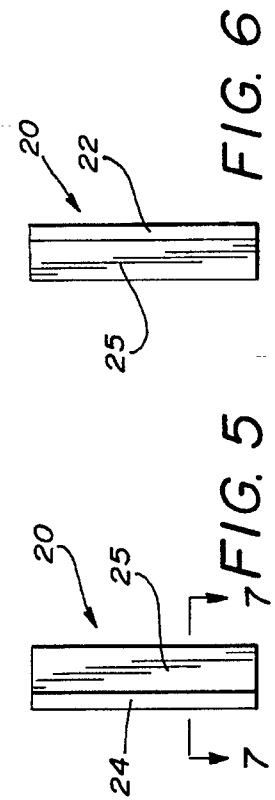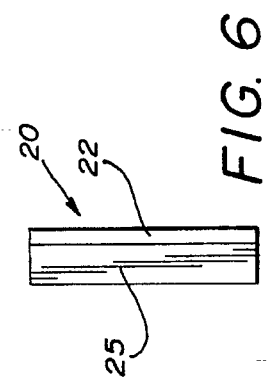

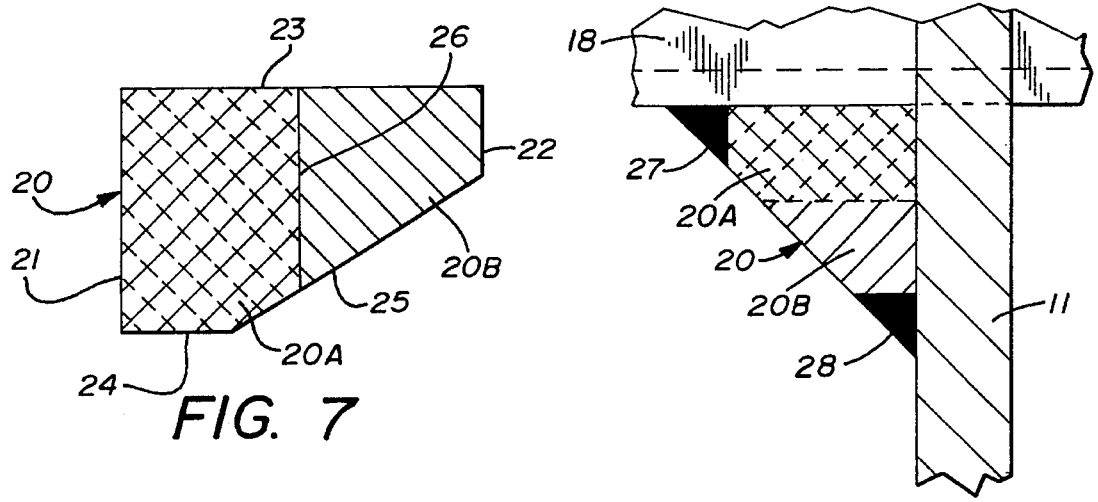
FIG. 7
FIG. 9
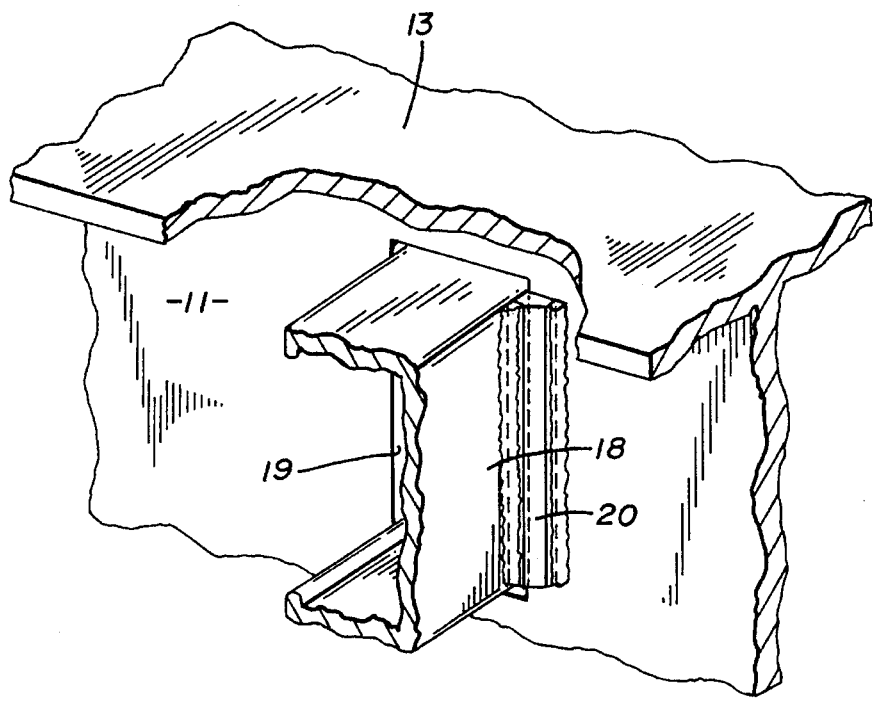
FIG. 8

COMPOSITE TRAILER ASSEMBLY USING BI-METAL MATERIALS

BACKGROUND OF THE INVENTION

1. Technical Field

This invention relates to the fabrication of composite trailers of steel and aluminum components that require the joining of two dissimilar materials in a strong durable joint.

2. Description of Prior Art

Prior art methods and structures of this type have relied on a variety of different joining techniques to address the problems of joining aluminum alloys to ferrous alloys as the result of metallurgical incompatibility as is evident when mechanical fasteners are used with a transition bracket. Such mechanical fasteners and bracket techniques often fail when exposed to the over the road environment due to the different rates of flexibility inherent between aluminum alloys and ferrous metals, fasteners often work loose. Corrosion and galvanic reactions between dissimilar trailer components tend to shorten the trailer's useful life by premature failure at critical joints of intersecting materials, see for example U.S. Pat. Nos. 4,281,235, 3,975,612, 3,872,577, 3,664,816, 3,597,832, 3,460,235, 3,460,235, 3,175,284, 3,295,197, 3,100,338, additional U.S. Pat. Nos. 2,600,140, 2,758,870, 4,212,405 and 4,904,017.

In U.S. Pat. No. 4,281,235 a method for welding ferrous alloys to aluminum and aluminum alloys utilizes coating a portion of the ferrous alloys to be welded with an intermediate material compound or element such as gold alloy or silver and then directing an accelerated particle beam at the area to be welded, etc.

In U.S. Pat. No. 3,975,612 a welding method for dissimilar metals is disclosed wherein a filler metal is deposited on one end of a dissimilar metal to be joined with the filler metal being the same material as that of the other of said dissimilar materials.

In U.S. Pat. No. 3,872,577 a method of manufacturing a conductor rail is disclosed which utilizes a rail of aluminum body and a steel element by liquifying a portion of the adjacent layer and joining the two materials together without formation of an intermediate metallic layer.

In U.S. Pat. No. 3,664,816 a steel to aluminum transition piece is disclosed in which the transition joint of the disclosure is formed by making a pressure weld between aluminum alloy and steel through a special aluminous bonding element. The aluminous bonding element is primarily aluminum with the transition material being stainless steel as the steel element.

In U.S. Pat. No. 3,597,832 a inertia welding of steel to aluminum process is disclosed which utilizes the conical projection of parts which are spun welded by friction to one another.

In U.S. Pat. No. 3,460,235 the welding of a transition piece is disclosed in which a transition piece is formed by welding a tube of the first metal to a tube of the second metal by friction welding thus providing the ability of working the transition piece to produce a thin transition piece as having good mechanical properties.

In U.S. Pat. No. 3,175,284 a method of friction welding of dissimilar metals is disclosed in which one of the surfaces rotated relative to the other surface so as to generate heat for the welding process.

In U.S. Pat. No. 3,295,197 a stainless steel clad with aluminum composition metal configuration is disclosed in which stainless steel sheets are bonded to aluminum to provide a highly desirous component material.

Finally, in U.S. Pat. No. 3,100,338 a method of joining is disclosed which relates to the joining of aluminum metal to refractory hard metals into a flux composition which is used in the joining process.

SUMMARY OF THE INVENTION

Utilizing the joining of dissimilar materials by welding a composite trailer construction which takes advantage of the structural synergisms of an aluminum and steel trailer construction configuration. The composite trailer construction is directed to using a preformed precisely proportioned bi-metal joining element that is used to secure the aluminum cross bars of the composite trailer assembly to the supporting steel I-beams affecting a common metal welding surface between dissimilar structural element materials.

DESCRIPTION OF THE DRAWINGS

FIG. 1 is a side elevational view of a composite trailer assembly;

FIG. 2 is a top plan view with a portion broken away of the composite trailer assembly of FIG. 1;

FIG. 3 is an enlarged side plan view of a portion of the composite trailer showing the interconnection between two dissimilar metals;

FIG. 4 is an enlarged cross-sectional view on lines 4—4 of FIG. 3;

FIG. 5 is an enlarged front plan view of a bi-metal element;

FIG. 6 is a side plan view of the bi-metal element of FIG. 5;

FIG. 7 is an enlarged cross-sectional view on lines 7—7 of FIG. 5;

FIG. 8 is an enlarged perspective view of a portion of the composite trailer assembly with parts broken away;

FIG. 9 is an enlarged cross-sectional view of a weld joint formed between the dissimilar materials as illustrated in FIG. 8.

DESCRIPTION OF THE PREFERRED EMBODIMENT

Figure 11:
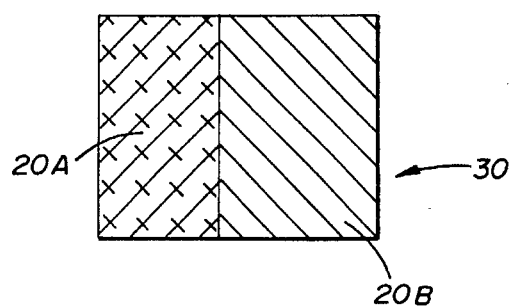
FIG. 11 is an enlarged cross-sectional view of an alternate bi-metal configuration illustrated in FIG. 10.
Figure 12:
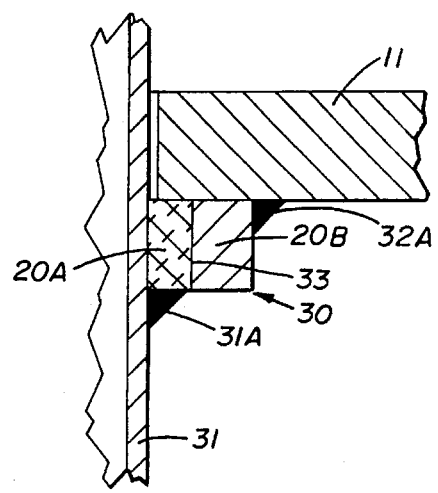
FIG. 12 is an enlarged cross-sectional view of a weld joint formed between two dissimilar metals using an alternate bi-metal configuration on lines 12—12 of FIG. 10.

A composite trailer assembly as best seen in FIGS. 1 and 2 of the drawings wherein a flat bed trailer 10 (chosen for illustration) can be seen having a frame assembly formed of a pair of horizontally spaced longitudinally extending I shaped steel beams 11 and 12 with respective upper and lower bi-directional flanges 13 and 14 thereon.

Wheels 15 are shown in broken lines in FIG. 1 of the drawings on a wheel support assembly, not shown, which is positioned under the rear portion of the composite trailer assembly and secured to the longitudinally extending steel beams 11 and 12 as will be well known and understood by those skilled in the art.

A retractable dual leg support 16 is attached to the forward portion of the composite trailer assembly by brackets 17. A trailer bed 10A is formed on top of the frame assembly with a rub rail 10B defining a typical trailer configuration chosen for illustration.

It will be seen that a plurality of cross frame members 18 having a cross-sectionally C-shaped configuration are located in longitudinally spaced transverse aligned openings 19 in the upper portions of the respective longitudinally extending steel I-beams 11 and 12 as hereinbefore described. Each of the respective cross frame members 18 is positioned through said respective aligned openings 19 in the steel beams 11 and 12 and are secured thereto by welding using a bi-metal element 20, best seen in FIGS. 3–9 of the drawings.

The bi-metal element 20 is composed of an aluminum alloy 20A bonded to a ferrous metal alloy 20B such as structural steel in this example.

Referring now to FIGS. 5, 6, 7 and 9, the bi-metal element 20 can be seen having a contoured elongated rectangular configuration with oppositely disposed parallel sides 21 and 22 and 23 and 24 respectively with an angularly disposed sidewall 25 interconnecting the respective sidewalls 22 and 24.

The bi-metal element 20 is divided along a material transition line 26 between the aluminum alloy 20A and the ferrous metal alloy 20B so that the aluminum alloy 20A defines all of the respective sidewall surfaces 21 and 24, and a portion of the sidewall surfaces 23 and 25. Conversely, the ferrous metal alloy 20B defines all of the sidewall surface 22 and a portion of the respective sidewall surfaces 23 and 25.

The characteristics of the bi-metal element 20's shape and transition point is critical to the selective application in the composite trailer assembly construction as will be seen in applied application by referring to FIGS. 8 and 9 of the drawings.

In FIG. 9 an enlarged cross-sectional view of a completed weld joint assembly between one of the cross frame members 18 and the steel I-beam 11. An aluminum to aluminum weld 27 is possible by using the bi-metal element 20 configuration that provides the optimum amount of adjacent aluminum surfaces positioned in this illustration at right angles to one another to effect a high quality aluminum weld standard required in composite trailer construction.

A steel alloy to steel alloy weld 28 is also possible with the use of the bi-metal element 20 configuration providing a 90 degree right angular adjacent joining relationship between the surfaces to be welded. The respective completed bi-metal welds 27 and 28 effectively isolates the direct contact between the structural elements of dissimilar materials eliminating galvanic reaction and associated corrosion typically present in dissimilar metal joining techniques such as mechanical fasteners and the like.

Referring to FIG. 3 of the drawings, it will be seen that the openings 19 in the respective longitudinal I-beams 11 and 12 are dimensionally larger than the respective cross-sections of the cross-frame members 18 so that the cross-frame members 18 will be positioned within the openings 19 in spaced relation to the I-shaped steel beams 11 and 12.

Figure 10:
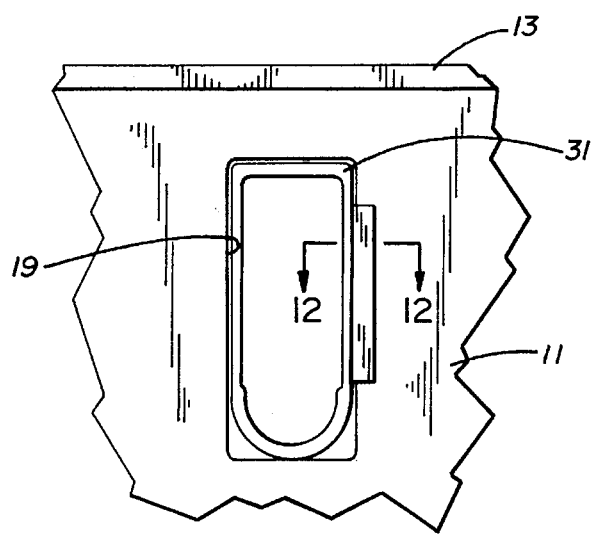
FIG. 10 is an enlarged side plan view of a portion of the composite trailer showing an alternate cross beam configuration interconnecting between two dissimilar metals using an alternate bi-metal configuration.
Figure 13:
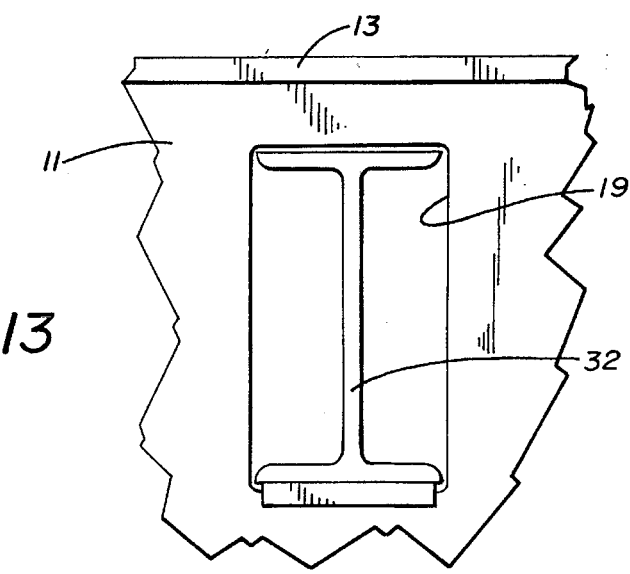
FIG. 13 is an enlarged cross-sectional view of an alternate cross member element weld joint using an alternate bi-metal construction illustrated in FIG. 11.

Referring now to FIGS. 10–13 of the drawings, alternate forms of the invention can be seen utilizing an alternate bi-metal element configuration 30 to join alternate cross beam configurations, specifically a hollow cross beam member 31, best seen in FIG. 10 of the drawings and an (I-beam) cross beam member 32 best illustrated in FIG. 13 of the drawings.

The bi-metal element 30 is of an elongated cross-sectionally rectangular configuration divided along a material transition line 33 between said aluminum alloy 20A and said ferrous metal alloy 20B as will be well understood by those skilled in the art.

The respective cross beam configurations 31 and 32 are positioned through said aligned openings 19 in the hereinbefore described steel beams 11 and 12. The respective cross beam members 31 and 32 are secured to the steel beams 11 and 12 by respective aluminum to aluminum weld joints 31A and ferrous metal to ferrous metal weld joints 32A, best illustrated in FIG. 12 of the drawings wherein the hollow cross beam member 31 welds are specifically illustrated.

It will be evident to those skilled in the art that the utilization of alternate cross beam configurations as disclosed above would be used in like groups within a specific composite trailer configuration which would necessitate the alternate bi-metal configuration and alternate positionings of the bi-metal for welding purposes depending on the requirements of the particular composite trailer using one of the specific groups of alternate cross beam configurations illustrated and described above.

It will be seen that the composite trailer illustrated in the flat bed trailer 10 has been disclosed that incorporates the utilization of a bi-metal element specifically configured to be adapted to dissimilar metal joining requirements in the composite trailer assembly configuration chosen for illustration.

It will therefore be apparent to those skilled in the art that various changes and modifications may be made therein without departing from the spirit of the invention.

Therefore I claim:

1. A composite trailer on wheels having a framework comprising;
    a. a floor assembly having a front and rear section, said assembly comprising a plurality of horizontally spaced beams extending from the front section to the rear section, each beam having an opening, the opening in each beam being vertically aligned with the opening in its adjacent beam, said beams being made of a ferrous metal alloy and said floor assembly being attached to said wheels;
    b. a retractable dual leg support being attached to the front section of the assembly;
    c. a cross frame member being located perpendicularly to the beams through the vertically aligned openings therein forming an intersection between the cross frame member and each beam, the cross frame member being made of a lightweight aluminum type metal;
    d. a bi-metal element for joining the cross frame member with each beam at each intersection, said bi-metal element having a first and second metal composition, the first metal composition being of an aluminum type metal that is substantially similar to the metal composition of the cross frame member, the second metal composition being of a ferrous type metal that is substantially similar to the composition of the ferrous metal used for the beams, the bi-metal element being divided along a material transition line between the first metal composition and the second metal composition;
    e. the bi-metal element being positioned along side the cross frame member and the beam at each intersection, the first metal composition being welded to the cross frame member by an aluminum type weld and the second metal composition being welded to the beam by a ferrous type weld.

2. A composite trailer, according to claim 1, wherein each of said beams has an I-shaped configuration with respective upper and lower bi-directional flanges.

3. A composite trailer, according to claim 1 or 2, wherein the cross frame member intersects each beam at a right angle, and the bi-metal element having a configuration providing a right angle which adjoins the intersecting interface between the beam and the cross frame member.

4. A composite trailer, according to claim 1 or 2, wherein the cross frame member has a cross-sectional C-shaped configuration.

5. A composite trailer, according to claim 1 or 2, wherein the cross frame member has a cross-sectional I-shaped configuration.

6. A composite trailer, according to claim 1 or 2, wherein the cross frame member has a cross-sectional rectangular hollow beam configuration.

7. A composite trailer, according to claim 2, wherein the bi-metal element has a pentagonal configuration.

8. A composite trailer, according to claim 2, further comprising a flat rectilinear plate-like portion secured to the upper bi-directional flanges of the beams.

9. A method of composite trailer construction entailing the joining by welding of two dissimilar metals comprising the steps of a. preparing an opening in a first metal member of a trailer frame assembly b. preparing an opening in a second metal member of a trailer frame assembly of a similar metal to said first member c. aligning said openings in said first and second metal members of the trailer frame assembly d. positioning a cross frame member through said defined openings in said first and second metal members, said cross frame member being of a dissimilar material than said first and second metal members e. forming weld joints of like material between said cross frame member and said first and second metal members by positioning a bi-metal element between said cross frame member and respective first and second members, welding along the interface between said cross frame member and said bi-metal element and said respective first and second members.

10. The method of composite trailer construction of claim 9 wherein said openings in said first and second metal members are of a known dimension, and said cross frame member is of a cross-sectional dimension less than that of said openings known dimension.

11. The method of composite trailer construction of claim 9 wherein said first and second metal members are in spaced parallel relation to one another.

12. The method of composite trailer construction of claim 9 wherein said first and second metal members are I-beam configurations.

13. The method of composite trailer construction of claim 9 wherein said cross frame member is of a cross-sectionally hollow beam configuration.

14. The method of composite trailer construction of claim 9 wherein said first and second metal members are comprised of a steel alloy material.

15. The method of composite trailer construction of claim 9 wherein said cross frame member is of an aluminum alloy material.

16. The method of composite trailer construction of claim 9 wherein said bi-metal element is formed of a aluminum and steel alloy composite.

17. The method of composite trailer construction of claim 9 wherein said cross frame member is of a cross-sectionally C-shaped configuration.

18. The method of composite trailer construction of claim 9 wherein said cross frame member is of a cross-sectionally I-beam shaped configuration.

\* \* \* \* \*